United States Patent
Yu et al.

(10) Patent No.: US 12,089,235 B2
(45) Date of Patent: *Sep. 10, 2024

(54) METHODS AND APPARATUSES FOR UPLINK TRANSMISSION MANAGEMENT

(71) Applicant: Hannibal IP LLC, Frisco, TX (US)

(72) Inventors: Chia-Hao Yu, Taipei (TW); Yu-Hsin Cheng, Taipei (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,455

(22) Filed: Apr. 19, 2023

(65) Prior Publication Data

US 2023/0389059 A1   Nov. 30, 2023

Related U.S. Application Data

(63) Continuation of application No. 16/991,017, filed on Aug. 12, 2020, now Pat. No. 11,665,721.

(Continued)

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0626* (2013.01); *H04L 5/0051* (2013.01);
(Continued)

(58) Field of Classification Search
CPC . H04W 72/53; H04W 52/242; H04W 72/046; H04W 76/27; H04W 52/325;
(Continued)

(56) References Cited

U.S. PATENT DOCUMENTS 11,665,721 B2   5/2023   Yu et al.
2019/0141693 A1   5/2019   Guo et al.
(Continued)

FOREIGN PATENT DOCUMENTS

CN   110120859   8/2019
CN   114258725   3/2022
(Continued)

OTHER PUBLICATIONS

Final Examination Report issued on Jul. 21, 2023, for corresponding Indian Patent Application No. 202247005222.
(Continued)

*Primary Examiner* — Chae S Lee
(74) *Attorney, Agent, or Firm* — Marcella M. Bodner; Cole Schotz, P.C.

(57) ABSTRACT

A method, performed by a User Equipment (UE), for Uplink (UL) transmission management includes the UE determining a default spatial domain transmission filter for an UL resource according to at least one Quasi Co-Location (QCL) parameter of a Control Resource Set (CORESET) after determining that the UL resource is not configured with a spatial domain transmission filter and a pathloss reference Reference Signal (RS) resource, and transmitting the UL resource by applying the default spatial domain transmission filter.

6 Claims, 6 Drawing Sheets

Related U.S. Application Data

(60) Provisional application No. 62/888,010, filed on Aug. 16, 2019.

(51) Int. Cl.
| | |
|---|---|
| *H04L 5/00* | (2006.01) |
| *H04L 25/02* | (2006.01) |
| *H04W 52/24* | (2009.01) |
| *H04W 72/044* | (2023.01) |
| *H04W 76/27* | (2018.01) |

(52) U.S. Cl.
CPC ....... *H04L 25/0226* (2013.01); *H04W 52/242* (2013.01); *H04W 72/046* (2013.01); *H04W 76/27* (2018.02)

(58) Field of Classification Search
CPC . H04B 7/0626; H04B 7/06966; H04L 5/0051; H04L 25/0226
See application file for complete search history.

(56) References Cited

U.S. PATENT DOCUMENTS

| | | | |
|---|---|---|---|
| 2019/0349964 A1 | 11/2019 | Liou | |
| 2020/0195334 A1* | 6/2020 | Zhou | ........................ H04L 5/005 |
| 2020/0196277 A1 | 6/2020 | Zhou | |
| 2020/0314664 A1 | 10/2020 | Zhou | |
| 2022/0030579 A1 | 1/2022 | Cirik | |

FOREIGN PATENT DOCUMENTS

| | | |
|---|---|---|
| EP | 4014631 | 6/2022 |
| IN | 202247005222 | 3/2022 |
| WO | 2018217063 | 11/2018 |
| WO | 2019136678 | 7/2019 |
| WO | 2021028059 | 2/2021 |
| WO | 2021031910 | 2/2021 |

OTHER PUBLICATIONS

Issue Notification issued on May 30, 2023 for U.S. Appl. No. 16/991,017.
Notice of Allowance issued on Feb. 24, 2023 for U.S. Appl. No. 16/991,017.
Non-Final Office Action issued on Aug. 29, 2022 for U.S. Appl. No. 16/991,017.
Final Office Action issued on May 4, 2022 for U.S. Appl. No. 16/991,017.
Non-Final Office Action issued on Oct. 22, 2021 for U.S. Appl. No. 16/991,017.
Intel Corporation, 3GPP, TSG RAN WG1 Meeting # 93, R1-180615, On the remaining issues of QCL May 25, 2018 (May 25, 2018), the whole document.
International Preliminary Report on Patentability issued on Feb. 17, 2022 for International Patent Application No. PCT/CN2020/108260.
International Search Report issued on Nov. 18, 2020, for International Patent Application No. PCT/CN2020/108260.
Nokia et al., 3GPP, TSG RAN WG1#92, R-1-1803328, Summary of QCL Mar. 2, 2018(Mar. 2, 2018), sections 4 and 5.
Written Opinion of the International Searching Authority, issued on Nov. 18, 2020.
Extended European Search Report issued on Aug. 2, 2023 for corresponding European Patent Application No. 20854528.5.
Fujitsu, "Ambiguities about PUCCH beam indication", 2018, 3rd Generation Partnership Project, 3GPP Draft; R1-1806120, vol. RAN WG1, No. Busan, Korea.
MCC Support: Draft Report of 3GPP TSG Ran WG1 #95 v0.1.0, 2018, 3rd Generation Partnership Project (3GPP), XP051494884, vol. Ran WG1, No., Athens, USA.

* cited by examiner

METHODS AND APPARATUSES FOR UPLINK TRANSMISSION MANAGEMENT

CROSS-REFERENCE TO RELATED APPLICATION(S)

The present application is a continuation application of U.S. patent application Ser. No. 16/991,017, filed on Aug. 12, 2020, now allowed, which claims the benefit of and priority to provisional U.S. Patent Application Ser. No. 62/888,010 ("the '010 provisional"), filed on Aug. 16, 2019, entitled "Signaling Overhead Reduction for UL Beam Management." The contents of the '010 provisional are fully incorporated herein by reference for all purposes.

FIELD

The present disclosure generally relates to wireless communications, and more particularly, to methods and apparatuses for Uplink (UL) transmission management.

BACKGROUND

With the tremendous growth in the number of connected devices and the rapid increase in user/Network (NW) traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the NW services and types, accommodating various use cases such as Enhanced Mobile Broadband (eMBB), Massive Machine-Type Communication (mMTC), and Ultra-Reliable and Low-Latency Communication (URLLC).

However, as the demand for radio access continues to increase, there is a need for further improvements of wireless communication for the next-generation wireless communication system.

SUMMARY

The present disclosure is directed to methods and apparatuses for UL transmission management.

According to an aspect of the present disclosure, a method, performed by a User Equipment (UE), for UL transmission management is provided. The method includes the UE determining a default spatial domain transmission filter for an UL resource according to at least one Quasi Co-Location (QCL) parameter of a Control Resource Set (CORESET) after determining that the UL resource is not configured with a spatial domain transmission filter and a pathloss reference Reference Signal (RS) resource, and transmitting the UL resource by applying the default spatial domain transmission filter.

According to another aspect of the present disclosure, a UE for UL transmission management in a wireless communication system is provided. The UE includes a memory and at least one processor coupled to the memory. The at least one processor is configured to determine a default spatial domain transmission filter for an UL resource according to at least one QCL parameter of a CORESET after determining that the UL resource is not configured with a spatial domain transmission filter and a pathloss reference RS resource, and transmit the UL resource by applying the default spatial domain transmission filter.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
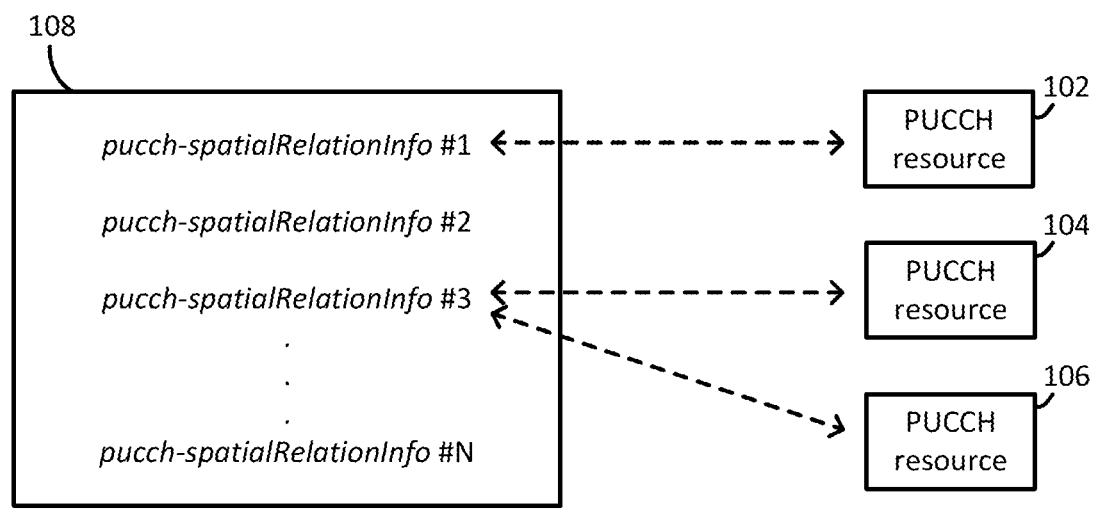
FIG. 1 illustrates a list of spatial relation information configured for Physical UL Control Channel (PUCCH) operations, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure so described may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The term "and/or" herein is only an association relationship for describing associated objects, and represents that three relationships may exist, for example, A and/or B may represent that: A exists alone, A and B exist at the same time, and B exists alone. "A and/or B and/or C" may represent that at least one of A, B and C exists. In addition, the character "/" used herein generally represents that the former and latter associated objects are in an "or" relationship.

Additionally, for the purpose of non-limiting explanation, specific details, such as functional entities, techniques, protocols, standards, and the like, are set forth for providing an understanding of the described technology. In other examples, a detailed description of well-known methods, technologies, systems, architectures, and the like are omitted so as not to obscure the description with unnecessary details.

Persons skilled in the art will immediately recognize that any NW function(s) or algorithm(s) described in the present disclosure may be implemented by hardware, software, or a combination of software and hardware. Described functions may correspond to modules that may be software, hardware, firmware, or any combination thereof. The software implementation may comprise computer-executable instructions stored on computer-readable media such as memory or other types of storage devices. For example, one or more microprocessors or general-purpose computers with communication processing capability may be programmed with corresponding executable instructions and carry out the described NW function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long Term Evolution (LTE) system, an LTE-Advanced (LTE-A) system, or an LTE-Advanced Pro system) typically includes at least one Base Station (BS), at least one UE, and one or more optional NW elements that provide connection towards an NW. The UE communicates with the NW (e.g., a Core NW (CN), an Evolved Packet Core (EPC) NW, an Evolved Universal Terrestrial Radio Access NW (E-UTRAN), a Next-Generation Core (NGC), or an Internet), through a Radio Access NW (RAN) established by the BS.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE Radio Access NW (GERAN), a Next Generation eNB (ng-eNB) as in an E-UTRA BS in connection with the 5GC, a next-generation Node B (gNB) as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage, (e.g., each cell schedules the Downlink (DL) and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A PSCell may refer to the SpCell of an SCG. MCG refers to a group of serving cells associated with the Master Node (MN), comprising the SpCell and optionally one or more secondary cells (SCells). SCG refers to a group of serving cells associated with the Secondary Node (SN), comprising of the SpCell and optionally one or more SCells.

As discussed above, the frame structure for NR is to support flexible configurations for accommodating various next generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the NW dynamics of NR. In addition, SL resources may also be provided in an NR frame to support ProSe services.

The NR system may support beam management for enabling, but not limited to, high-frequency band (e.g., millimeter-wave frequency band) communication. To combat higher pathloss in a high-frequency band, a beamforming technique is adopted for providing additional gain, with the cost of reduced spatial coverage for signal transmission and reception. To make up for the lost spatial coverage of beamforming, a beam is steered towards different directions in Time Division Multiplexing (TDM) manner so that after a certain period of time, the UE or the gNB can still learn its environment with a desired spatial coverage.

In NR, for example, Release-15 (Rel-15), beam management is supported by a Transmission Configuration Indication (TCI) framework and spatial relation information for DL and UL, respectively. For DL, different types of a Qusai-CoLocation (QCL) assumption is indicated. Among them, QCL-type D is related to spatial receiving characteristics that may be used by a UE for receiving a target RS or channel. In the UL direction, the spatial transmitting characteristic may be indicated to the UE via the spatial relation information provided by the NW side. A UE may perform UL transmission for UL channel(s) and signal(s) accordingly.

For a UE with beam correspondence, DL beam management procedures that may involve DL beam measurement and reporting may provide enough information for selecting a suitable UL beam for UL transmission. In this case, not only the UL beam sweeping procedure can be saved, but also the UL beam indication signaling. However, such an UL operation mode is not yet introduced in the NR system.

To save UL beam indication signaling for, e.g., an UL control channel (e.g., PUCCH), an UL data channel (e.g., Physical UL Shared Channel (PUSCH)), or an UL SRS, enabling default spatial relation information for the concerned UL channel(s)/signal(s) for a beam correspondent UE based on the DL QCL assumption may be needed. In NR Rel-15 (e.g., Technical Specification (TS)38.214 V15.5.0), a QCL assumption for the Demodulation RS (DM-RS) ports of a Physical DL Shared Channel (PDSCH) of a serving cell may be determined based on the QCL parameters of the CORESET(s) configured to a UE. More specifically, the QCL assumption of the DM-RS ports of a PDSCH of a serving cell may be determined based on the following text in Table 1:

TABLE 1

● If a DL scheduling offset of scheduling DL Control Information (DCI) is larger than a threshold (timeDurationForQCL)
  ■ If TCI indication field is not provided in the scheduling DCI
    - QCL assumption for the PDSCH is identical to the QCL assumption whichever is applied for the CORESET used for the transmission of Physical DL Control Channel (PDCCH) corresponding to the scheduling DCI.
  ■ If TCI indication field is provided in the scheduling DCI
    - QCL assumption for the PDSCH is determined based on the TCI field in the scheduling DCI.
● If the DL scheduling offset of the scheduling DCI is less or equal to a threshold (timeDurationForQCL)
  ■ The UE may assume that QCL parameters of PDSCH of the serving cell are identical to the QCL parameter(s) used for the PDCCH QCL indication of the CORESET associated with a monitored search space with the lowest CORESET identifier (CORESET-ID) in the latest slot in which one or more CORESETs within the active Bandwidth Part (BWP) of the serving cell are monitored by the UE.

However, in order to enable the spatial relation information of a PUCCH and/or the spatial relation information of an SRS to follow QCL parameters of a CORESET, at least one of the following dimensions (i) to (vi) may also be considered:

(i) PUCCH resources may be grouped, and the default spatial relation information determination for PUCCH may be PUCCH resource group-based.

(ii) DL CORESETs may be grouped, with a CORESET group corresponding to, e.g., the same Transmit-Receive Point (TRP). The default spatial relation information determination for a PUCCH/SRS may correspond to different CORESET groups.

(iii) SRS resource set configured with usage: {codebook, nonCodebook, antennaSwitching} may need to be differentiated.

(iv) Pathloss reference RS for UL power control may be configured in different manners for PUCCH resources and for SRS resources. Default spatial relation information determination may take this part into account.

(v) Periodic (P)/semi-persistent (SP)/aperiodic (AP) PUCCH transmissions may follow different behavior for determining default spatial relation information.

(vi) Default spatial relation information determination may differentiate itself between self-carrier scheduling and cross-carrier scheduling.

It should be understood that a spatial relation may be conceptualized as a spatial domain transmission filter or a beam. Thus, in the present disclosure, the terms "spatial relation," "spatial domain transmission filter," and "beam" may be utilized interchangeably.

1. Default Spatial Relation for PUCCH

For PUCCH operations, a UE may be configured with at least one spatial relation (or "spatial domain transmission filter") via Radio Resource Control (RRC) signaling (e.g., an RRC configuration) from a BS. Each spatial domain transmission filter may be indicated by a corresponding spatial relation information parameter (e.g., an Information Element (IE) denoted as pucch-spatialRelationInfo) in the RRC configuration. In addition, the spatial relation information parameter may also indicate a DL pathloss reference RS for estimating DL pathloss for UL PUCCH power control purposes. For example, the spatial relation information parameter may include (or may be associated with) an IE denoted as pucch-PathlossReferenceRS.

For each PUCCH resource, its corresponding spatial domain transmission filter may be selected from the spatial domain transmission filter(s) configured to the UE, and activated via Medium Access Control (MAC)-Control Element (CE) activation signaling from the BS.

FIG. 1 illustrates a list of spatial relation information configured for PUCCH operations, in accordance with an implementation of the present disclosure.

As illustrated in FIG. 1, a UE may be configured with a list 108 of spatial relation information via RRC signaling from a BS. The list 108 of spatial relation information may include one or more pucch-spatialRelationInfo IEs (e.g., pucch-spatialRelationInfo #1 to pucch-spatialRelationInfo #N, where N is a natural number), where each pucch-spatialRelationInfo IE may be used to indicate or determine a spatial domain transmission filter or a beam for PUCCH operations. For example, for transmission of a PUCCH resource, the UE may select one of the pucch-spatialRelationInfo IEs in the list 108 to apply (e.g., based on the MAC-CE activation signaling from a BS). As illustrated in FIG. 1, the UE may be instructed by the BS (e.g., via the MAC-CE activation signaling) to use/apply the spatial domain transmission filter indicated by the pucch-spatialRelationInfo IE #1 to transmit the PUCCH resource 102, and use/apply the spatial domain transmission filter indicated by the pucch-spatialRelationInfo IE #3 to transmit the PUCCH resource 104 and the PUCCH resource 106.

In addition, each pucch-spatialRelationInfo IE in the list of spatial relation information may indicate a corresponding (DL) pathloss reference RS resource (not illustrated). For example, each pucch-spatialRelationInfo IE in the list of spatial relation information may include (or be associated with) an indication of a pathloss reference RS resource.

If the UE is configured with only one spatial domain transmission filter (e.g., there is only one pucch-spatialRelationInfo IE in the list 108), the present spatial domain transmission filter in the list (e.g., the list 108) may be used for the transmissions of the PUCCH resources (e.g., PUCCH resources 102, 104 and 106) allocated to the UE without the MAC-CE activation signaling.

In one implementation, the PUCCH resource may be used in a P/SP/AP manner. For example, a P/SP PUCCH resource may be used for P/SP Channel State Information (CSI) reporting, and an AP PUCCH resource may be used for Hybrid Automatic Repeat reQuest (HARQ)-Acknowledgement (ACK) feedback transmission(s).

An AP PUCCH transmission may be triggered by DCI from a BS. The DCI may be transmitted by the BS in a DL Component Carrier (CC) paired with an UL CC where the AP PUCCH transmission takes place (self-carrier scheduling), or in a DL CC not paired with the UL CC where the AP PUCCH transmission takes place (cross-carrier scheduling). Supplementary UL (SUL) operations may be considered as self-carrier scheduling in this case.

In one implementation, a UE may determine a spatial domain transmission filter for a PUCCH resource without explicit signaling from a BS. For example, a UE may apply a default spatial domain transmission filter for a PUCCH resource when the UE cannot acquire the pucch-SpatialRelationInfo IE from NW signaling (e.g., signaling from the BS).

In one implementation, the default spatial domain transmission filter(s) for individual PUCCH resources allocated to a UE may be determined independently.

In one implementation, the PUCCH resources may be grouped as one or more PUCCH resource groups. In this case, the default spatial domain transmission filter may be determined for each PUCCH resource group independently.

In one implementation, the grouping of the PUCCH resources may be formed implicitly or explicitly based on NW signaling. For example, the PUCCH resources associated with different UE panels may correspond to different PUCCH resource groups.

In one implementation, a single default spatial domain transmission filter may be used for transmissions of all PUCCH resources allocated to the UE.

In one implementation, the default spatial domain transmission filter for a PUCCH resource may follow the QCL parameter(s) of a CORESET, where the CORESET may be used for DL PDCCH monitoring.

In one implementation, the CORESET may be associated with a CORESET group.

In one implementation, the CORESET group may be associated with a TRP.

In one implementation, the CORESET may or may not correspond to a DL CC that is paired with the UL CC where the PUCCH resource resides. For example, the transmission on the PUCCH resource may be triggered by DCI, where a carrier indication field in the DCI may identify the UL CC.

In one implementation, a PUCCH resource may be associated with the CORESET by a BS via implicit/explicit signaling. For example, the PUCCH resource may be associated with (or included in) a PUCCH resource group. The BS may associate the PUCCH resource group with a CORESET group (including the CORESET) by mapping the PUCCH resource group to the CORESET group via NW signaling.

In one implementation, the CORESET may be associated with a monitored search space with the lowest CORESET-ID in the latest slot in which the associated CORESET group (including the CORESET) is monitored by the UE.

In one implementation, the associated CORESET group may include all configured CORESETs in the active BWP of a serving cell (or a CC).

In one implementation, the transmission on the PUCCH resource may correspond to an instance of a P/SP PUCCH transmission.

In one implementation, the CORESET may be associated with a search space on which the DCI that triggers the transmission on the PUCCH resource is received by the UE. For example, the transmission on the PUCCH resource transmission may correspond to an AP PUCCH transmission.

In one implementation, the CORESET may be preconfigured/predetermined. In one example, the CORESET is predetermined as having a highest or lowest CORESET-ID index in the active DL BWP in the CC.

In one implementation, the RS associated with the QCL-type D in the QCL parameters of the CORESET may be used to determine the default spatial domain transmission filter. In one implementation, the RS may be a pathloss reference RS. For example, when the spatial domain transmission filter for PUCCH transmission is not provided by NW signaling via pucch-SpatialRelationInfo, the pathloss reference RS for UL power control of the PUCCH transmission may be determined as:

- the RS indicated by the QCL parameter(s) of the CORESET (if there are multiple RSs indicated by the QCL parameters, the RS associated with the QCL-type D may be selected); or
- a preconfigured RS.

In one implementation, for determining a default spatial domain transmission filter for the transmission on a PUCCH resource (or a "PUCCH transmission") when the corresponding pucch-SpatialRelationInfo of the PUCCH resource is not provided by the NW signaling, the PUCCH resource may be associated with (or included in) a PUCCH resource group, where the PUCCH resource group may be associated with a CORESET group. In this case, the default spatial domain transmission filter for the transmission on the PUCCH resource may be determined based on the QCL parameter(s) of the CORESET associated with a monitored search space with the lowest CORESET-ID in the latest slot in which the CORESET group is monitored by the UE, if the PUCCH resource is for a P/SP transmission. In one implementation, the default spatial domain transmission filter for the transmission on the PUCCH resource may be determined based on the QCL parameter(s) of the CORESET associated with a search space on which the DCI that triggers the transmission on the PUCCH resource is received, if the PUCCH resource is for an AP transmission.

In one implementation, if there is more than one RS associated with the QCL parameter(s), the RS associated with the QCL-type D may be used to determine the default spatial domain transmission filter for a PUCCH resource. In one example, for power control of the transmission on the PUCCH resource, the pathloss reference RS may be used as the default spatial domain transmission filter.

2. Default Spatial Relation for SRS

The usage of an SRS resource set may be configured as one of {beamManagement, codebook, nonCodebook, antennaSwitching} as specified in the 3GPP NR specification, e.g., TS 38.331 V15.5.0. Each SRS resource may be RRC-configured by a BS with an SRS-SpatialRelationInfo IE for determining its spatial domain transmission filter for the UL transmission. For each SRS resource set, a (DL) pathloss reference RS resource (e.g., indicated by an IE denoted as pathlossReferenceRS) may be provided for estimating the DL pathloss for UL SRS power control purposes.

Figure 2:
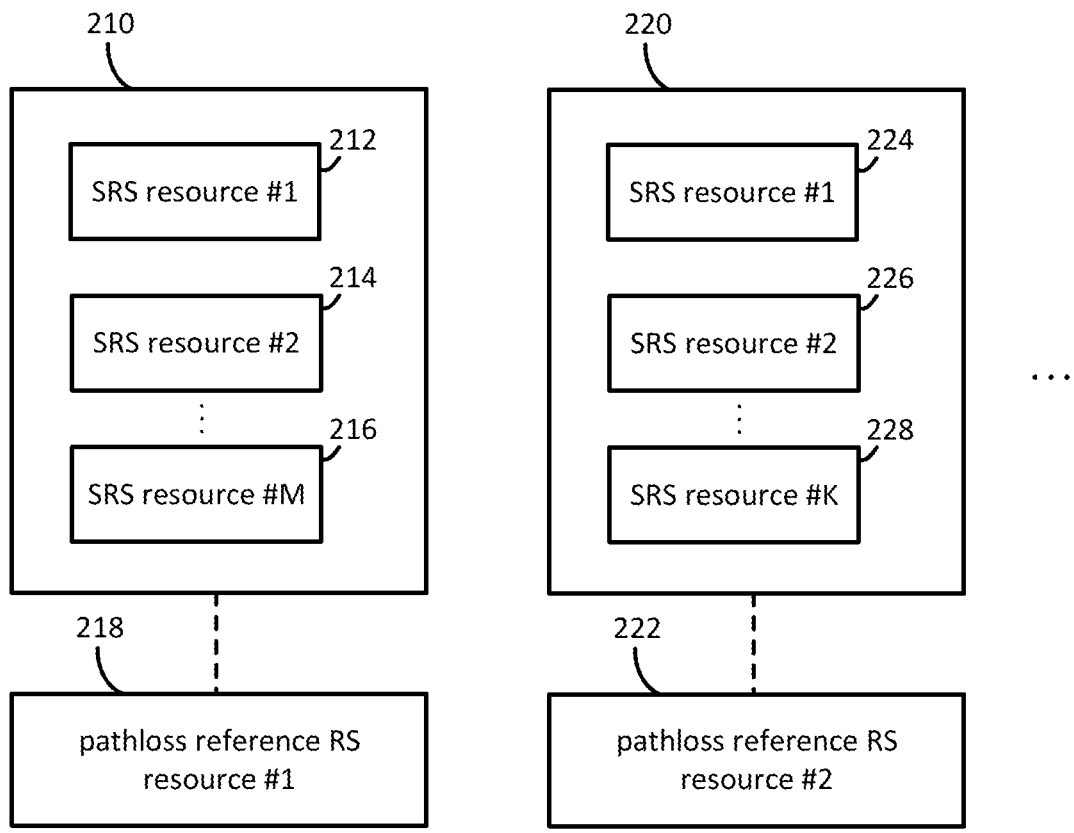
FIG. 2 illustrates multiple Sounding Reference Signal (SRS) resource sets each configured with a pathloss reference RS resource, in accordance with an implementation of the present disclosure.

FIG. 2 illustrates multiple SRS resource sets each configured with a (DL) pathloss reference RS resource, in accordance with an implementation of the present disclosure.

As illustrated in FIG. 2, a UE may be provided (or configured) with several SRS resource sets (e.g., including an SRS resource set 210 and an SRS resource set 220). Each SRS resource set may be associated with (or include) one or more SRS resources. For example, the SRS resource set 210 may include M SRS resources (e.g., the SRS resource #1 212, the SRS resource #2 214, and the SRS resource #2 216), and the SRS resource set 220 may include K SRS resources (e.g., the SRS resource #1 224, the SRS resource #2 226, and the SRS resource #2 228), where M and K are natural numbers. Each SRS resource in an SRS resource set may be configured with a spatial domain transmission filter (e.g., indicated by the SRS-SpatialRelationInfo IE). For example, if the corresponding SRS-SpatialRelationInfo IE is provided, an SRS resource may be transmitted based on a spatial domain transmission filter indicated by the corresponding SRS-SpatialRelationInfo IE.

In addition, each SRS resource set may be configured with a pathloss reference RS resource (e.g., indicated by the pathlossReferenceRS IE). As illustrated in FIG. 2, the SRS resource set 210 may be configured with the pathloss reference RS resource #1 218, and the SRS resource set 220 may be configured with the pathloss reference RS resource #2 222.

An SRS resource may be used in a P/SP/AP manner. For example, an AP SRS transmission may be triggered by DCI, where the DCI may be transmitted 1) in a DL CC paired with an UL CC where the AP SRS transmission takes place, or 2) in a DL CC not paired with the UL CC where the AP PUCCH transmission takes place. In this case, SUL operation(s) may be considered as scenario 1) described above, for example.

In the following subsections, methods for determining a default spatial domain transmission filter for transmission(s) on an SRS resource are provided. For ease of illustration, an SRS resource with the usage of its associated SRS resource set being configured as "codebook" may be referred to as an "SRS-codebook resource," an SRS resource with the usage of its associated SRS resource set being configured as "nonCodebook" may be referred to as an "SRS-nonCodebook resource," and an SRS resource with the usage of its associated SRS resource set being configured as "antennaSwitching" may be referred to as an "SRS-antennaSwitching resource." For example, if the usage of the SRS resource set 210 illustrated in FIG. 2 is configured as "nonCodebook," the SRS resources 212, 214, and 216 associated with (or included in) the SRS resource set 210 are SRS-nonCodebook resources.

2.1 SRS-nonCodebook Resource

In one implementation, there may be 1, 2, 3, or 4 SRS-nonCodebook resources being configured in a corresponding resource set. In addition, there may be an associatedCSI-RSIE being configured in an SRS-nonCodebook resource set. In this case, the spatial domain transmission filter for an SRS-nonCodebook resource may be determined based on explicit NW signaling via the associatedCSI-RS IE or the SRS-SpatialRelationInfo IE, but the NW may not provide both to the UE at the same time.

In one implementation, the spatial domain transmission filter for an SRS-nonCodebook resource may be determined without NW explicit signaling. For example, a default spatial domain transmission filter may be applied by a UE when, for example, neither the associatedCSI-RS IE nor the SRS-SpatialRelationInfo IE can be acquired from the NW signaling.

In one implementation, the default spatial domain transmission filter(s) for individual SRS-nonCodebook resources allocated to a UE may be determined independently.

In one implementation, the SRS-nonCodebook resources allocated to the UE may be grouped as one or more SRS-nonCodebook resource sets (e.g., the SRS resource sets 210 and 220 illustrated in FIG. 2). In this case, a default spatial domain transmission filter may be determined for an SRS-nonCodebook resource set. For example, an SRS-nonCodebook resource set may correspond to a UE panel, and multiple SRS-nonCodebook resource sets may be configured for mapping to multiple UE panels.

In one implementation, the default spatial domain transmission filter for an SRS-nonCodebook resource may follow the QCL parameter(s) of a CORESET, where the CORESET is for DL PDCCH monitoring.

In one implementation, the CORESET may be associated with a CORESET group.

In one implementation, the CORESET group may be associated with a TRP.

In one implementation, the CORESET may or may not correspond to a DL CC that is paired with the UL CC where the SRS-nonCodebook resource resides. For example, the transmission on the SRS-nonCodebook resource may be triggered by DCI, where a carrier indication field in the DCI may identify the UL CC.

In one implementation, the SRS-nonCodebook resource may be associated with the CORESET by the NW via implicit/explicit signaling. For example, the SRS-nonCodebook resource set associated with (or including) the SRS-nonCodebook resource may map to a CORESET group associated with (or including) the CORESET by NW signaling.

In one implementation, the CORESET may be associated with a monitored search space with the lowest CORESET-ID in the latest slot in which the associated CORESET group (e.g., including the CORESET) are monitored by the UE.

In one implementation, the associated CORESET group may include all configured CORESETs in the DL active BWP of a serving cell (or a CC).

In one implementation, the transmission on the SRS-nonCodebook resource may correspond to an instance of P/SP SRS transmission.

In one implementation, the CORESET may be associated with a search space on which the DCI that triggers the transmission on the SRS-nonCodebook resource is received by the UE. For example, the transmission on the SRS-nonCodebook resource transmission may correspond to an AP SRS transmission.

In one implementation, the CORESET may be preconfigured/predetermined. In one example, the CORESET may be predetermined/preconfigured as the one with the highest or the lowest CORESET-ID in the active DL BWP in the CC.

In one implementation, the default spatial domain transmission filter may follow the QCL parameter(s) of the PathlossReferenceRS IE configured for the associated SRS-nonCodebook resource set, if the UE is provided with the PathlossReferenceRS IE.

In one implementation, the RS associated with the QCL-type D in the QCL parameter(s) of the CORESET may be used to determine the default spatial domain transmission filter.

In one implementation, the default spatial domain transmission filter of an SRS-nonCodebook resource may follow the spatial domain transmission filter (e.g., indicated by the pucch-SpatialRelationInfo IE) of a PUCCH resource with the lowest PUCCH resource ID (e.g., PUCCH-ResourceId) within the active UL BWP of the serving cell that the SRS-nonCodebook resource resides. The PUCCH resource with the lowest PUCCH-ResourceId may be selected from the PUCCH resources whose spatial relation information has been activated by MAC-CE signaling.

In one implementation, when the PathlossReferenceRS IE is not provided by NW signaling for the associated SRS-nonCodebook resource set (e.g., in a case that the SRS resource set 210 illustrated in FIG. 2 is not configured with the pathloss reference RS resource #1 218), the pathloss reference RS for UL power control of the SRS-nonCodebook resource transmission may be determined as:

the RS indicated by the QCL parameter(s) of the CORESET (if there are multiple RSs indicated by the QCL parameters, the RS associated with the QCL-type D may be selected);

a CSI-RS (e.g., indicated by the associatedCSI-RS IE) associated with the corresponding SRS-nonCodebook resource set; or a preconfigured RS.

In one implementation, for determining a default spatial domain transmission filter for the transmission on an SRS-nonCodebook resource when the SRS-SpatialRelationInfo IE corresponding to the SRS-nonCodebook and the associatedCSI-RS IE corresponding to the SRS-nonCodebook are not provided by the NW signaling, the SRS-nonCodebook resource set including the SRS-nonCodebook resource may be associated with a CORESET group. In this case, the default spatial domain transmission filter for the transmission on the SRS-nonCodebook resource may be determined based on the QCL parameter(s) of the CORESET associated with a monitored search space with the lowest CORESET-ID in the latest slot in which the CORESET group are monitored by the UE, if the SRS-nonCodebook resource is for a P/SP transmission. In one implementation, if the SRS-nonCodebook resource is for an AP transmission, the default spatial domain transmission filter for the transmission on the SRS-nonCodebook resource may be determined based on the QCL parameter(s) of the CORESET associated with a search space on which the DCI that triggers the transmission on the SRS-nonCodebook resource is received.

In one implementation, if there is more than one RS associated with the QCL parameter(s), the RS associated with the QCL-type D may be applied for determining the default spatial domain transmission filter.

In one implementation, for power control of the transmission on an SRS-nonCodebook resource, when a UE is not configured with a pathloss reference RS for the corresponding SRS-nonCodebook resource set (e.g., in a case that the UE is not configured with the PathlossReferenceRS IE for the corresponding SRS-nonCodebook resource set), a pathloss reference RS may be determined as the default spatial domain transmission filter for the corresponding SRS-nonCodebook resource.

2.2 SRS-Codebook Resource(s) and SRS-antennaSwitching Resource(s)

In one implementation, there may be 1 or 2 SRS-codebook resources being configured in a corresponding resource set. A UE may determine a spatial domain transmission filter for an SRS-codebook resource and for an SRS-antennaSwitching resource without being explicitly indicated by the NW. In addition, a default spatial domain transmission filter may be applied when, for example, the UE cannot acquire the SRS-SpatialRelationInfo IE from the NW signaling. In the following, for ease of illustration, an SRS resource that is either an SRS-codebook resource or an SRS-antennaSwitching resource may be denoted as an "SRS-ac resource."

In one implementation, the default spatial domain transmission filter(s) for individual SRS-ac resources allocated to a UE may be determined independently.

In one implementation, the default spatial domain transmission filter may be configured by the BS based on an SRS-ac resource set basis.

In one implementation, if only a subset of SRS-ac resources in an SRS-ac resource set is not configured with the SRS-SpatialRelationInfo IE, the default spatial domain transmission filter may be applicable to the subset of SRS-ac resources.

In one implementation, the methods for determining default spatial domain transmission filter(s) may only be applicable when each SRS-ac resource in an SRS-ac resource set is not configured with an SRS-SpatialRelationInfo IE.

In one implementation, an SRS-ac resource set may be associated with a UE panel.

In one implementation, the default spatial domain transmission filter of an SRS-ac resource may follow the QCL parameter(s) of a CORESET for DL PDCCH monitoring.

In one implementation, the CORESET may be associated with a CORESET group.

In one implementation, the CORESET group may be associated with a TRP.

In one implementation, the CORESET may or may not correspond to a DL CC that is paired with the UL CC where the SRS-ac resource resides. For example, the transmission on the SRS-ac resource may be triggered by DCI, where a carrier indication field in the DCI may identify the UL CC.

In one implementation, an SRS-ac resource may be associated with the CORESET by NW via implicit or explicit signaling. For example, the SRS-ac resource set associated with (or including) the SRS-ac resource may map to a CORESET group associated with (or including) the CORESET by NW signaling.

In one implementation, the CORESET may be associated with a monitored search space with the lowest CORESET-ID in the latest slot in which an associated CORESET group (including the CORESET) is monitored by the UE.

In one implementation, the associated CORESET group may include all configured CORESETs in the DL active BWP of a serving cell (or a CC).

In one implementation, the transmission on the SRS-ac resource may correspond to an instance of a P/SP SRS transmission.

In one implementation, the CORESET may be associated with a search space on which the DCI that triggers the transmission on the SRS-ac resource is received.

In one implementation, the transmission on the SRS-ac resource transmission may correspond to an AP SRS transmission.

In one implementation, the CORESET may be preconfigured/predetermined. In one example, the CORESET is predetermined as the one with a higher or lowest CORESET-ID index in the active DL BWP in the CC.

In one implementation, the default spatial domain transmission filter for an SRS-ac resource may follow the QCL parameter(s) of the PathlossReferenceRS IE of the associated SRS-nonCodebook resource set (including the SRS-ac resource), if the UE is configured with the PathlossReferenceRS IE.

In one implementation, the RS associated with the QCL-type D in the QCL parameter(s) may be used as a default spatial domain transmission filter for an SRS-ac resource.

In one implementation, the default spatial domain transmission filter of an SRS-ac resource may follow the spatial domain transmission filter (e.g., determined by the pucch-SpatialRelationInfo IE) of the PUCCH resource with the lowest PUCCH-ResourceId within the active UL BWP of the serving cell where the SRS-ac resource resides.

In one implementation, when the PathlossReferenceRS IE is not provided by NW signaling for the associated SRS-ac resource set, a pathloss reference RS for UL power control for the SRS-ac resource transmission may be determined as:

the RS indicated by the QCL parameters of the CORESET (if there are multiple RSs indicated by the QCL parameters, the RS associated with QCL-type D may be selected); or a preconfigured RS.

In one implementation, for determining a default spatial domain transmission filter for the transmission on an SRS-ac resource when the SRS-SpatialRelationInfo IE corresponding to the SRS-ac resource is not provided by the NW signaling, the SRS-ac resource set (including the SRS-ac resource) may be associated with a CORESET group. In this case, the default spatial domain transmission filter for the transmission on the SRS-ac resource may be determined based on the QCL parameter(s) of the CORESET associated with a monitored search space with the lowest CORESET-ID in the latest slot in which the CORESET group is monitored by the UE, if the SRS-nonCodebook resource is for a P/SP transmission. In one implementation, the default spatial domain transmission filter for the transmission on the SRS-nonCodebook resource may be determined based on the QCL parameter(s) of the CORESET associated with a search space on which the DCI that triggers the transmission on the SRS-ac resource is received, if the SRS-ac resource is for an AP transmission.

In one implementation, if there is more than one RS associated with the QCL parameter(s), the RS associated with the QCL-type D may be applied for determining the default spatial domain transmission filter.

In one implementation, for power control of the transmission on the SRS-ac resource when the PathlossReferenceRS IE is not configured for the corresponding SRS-ac resource set, a pathloss reference RS may be used as the default spatial domain transmission filter for the SRS-ac resource.

Figure 3:
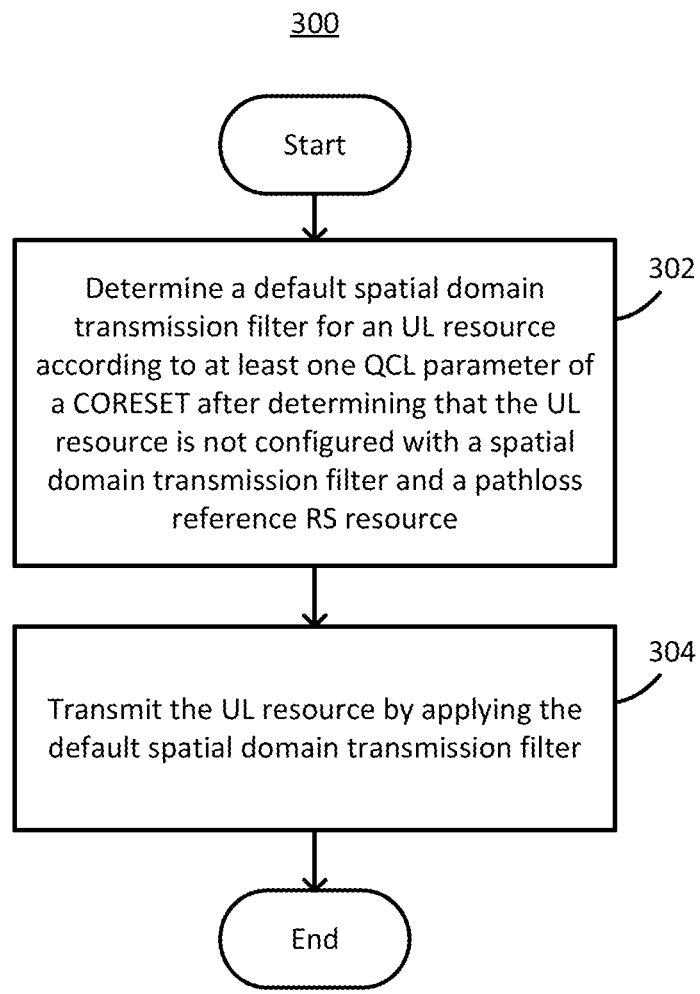
FIG. 3 illustrates a flowchart for a method of UL transmission management, in accordance with an implementation of the present disclosure.

FIG. 3 illustrates a flowchart for a method 300 of UL transmission management, in accordance with an implementation of the present disclosure. As illustrated in FIG. 3, the method 300 includes action 302 and 304.

In action 302, a UE may determine a default spatial domain transmission filter for an UL resource according to at least one QCL parameter of a CORESET after determining that the UL resource is not configured with a spatial domain transmission filter and a pathloss reference RS resource.

Two antenna ports are said to be QCL if properties of the channel over which a symbol on one antenna port is conveyed can be inferred from the channel over which a symbol on the other antenna port is conveyed. The "properties of the channel" above may include Doppler shift, Doppler spread, average delay, delay spread, and spatial Reception (Rx) parameters. These properties may be categorized into different QCL types/parameters (e.g., QCL-TypeA parameter(s), QCL-TypeB parameter(s), QCL-TypeC parameter(s), and QCL-TypeD parameter(s)) in NR specifications. For example, the QCL-TypeD (parameter) may refer to a spatial receiving parameter. The QCL-TypeD (parameter) may also be referred to a beam. The UE may determine the default spatial domain transmission filter based on the QCL type(s)/parameter(s) of the CORESET.

In one implementation, the UL resource may be an SRS resource included in an SRS resource set that is not configured with the pathloss reference RS resource. As illustrated in FIG. 2, the BS may configure the pathloss reference RS resource based on an SRS resource set basis, where each SRS resource set may include one or more SRS resources. In this case, the UE may apply the various implementations described in Section 2.0 to determine whether the UL resource is configured with a spatial domain transmission filter and a pathloss reference RS resource. For example, when an SRS resource set is not configured with a PathlossReferenceRS IE (indicating a pathloss reference RS resource) by the BS, the UE may determine that the SRS resource set is not configured with a pathloss reference RS. Also, the UE may determine that the SRS resource is not configured with a spatial domain transmission filter when the SRS resource is not configured with an SRS-SpatialRelationInfo IE (or a spatial relation information parameter) indicating a spatial domain transmission filter for SRS transmission.

In one implementation, the UL resource and the CORESET may be associated with the same CC. For example, in a case that the CORESET is associated with (or included in) a CORESET group in a DL active BWP of a CC, and also the UL resource is provided in the UL counterpart of the CC (either pair CC or unpair CC), the UL resource and the CORESET may be considered to be associated with the same CC.

In one implementation, the UL resource may be a PUCCH resource. In this case, the UE may apply the various implementations described in Section 1 to determine whether the UL resource is configured with a spatial domain transmission filter and a pathloss reference RS resource. For example, when a PUCCH resource is not configured with a pucch-spatialRelationInfo IE or a pucch-PathlossReferenceRS IE, the UE may determine that the PUCCH resource is not configured with a pathloss reference RS resource. Also, the UE may determine that a PUCCH resource is not configured with a spatial domain transmission filter when the PUCCH resource is not configured with the pucch-spatialRelationInfo IE (or a spatial relation information parameter) indicating a spatial domain transmission filter for PUCCH transmission.

In one implementation, the UE may determine a default pathloss reference RS resource for the UL resource by selecting an RS resource with QCL-type D from a plurality of RS resources indicated by the at least one QCL parameter of the CORESET. For example, if the QCL parameter(s) of the CORESET indicates an RS #1 and an RS #2, where the RS #1 is associated with QCL-type A and the RS #2 is associated with QCL-type D, the UE may select the RS #2 as the default pathloss reference RS resource for the UL resource.

In action 304, the UE may transmit the UL resource by applying the default spatial domain transmission (Tx) filter. For example, the UE may transmit the UL resource by using the spatial Tx and/or Rx parameter(s) corresponding to the default spatial domain transmission filter.

Figure 4:
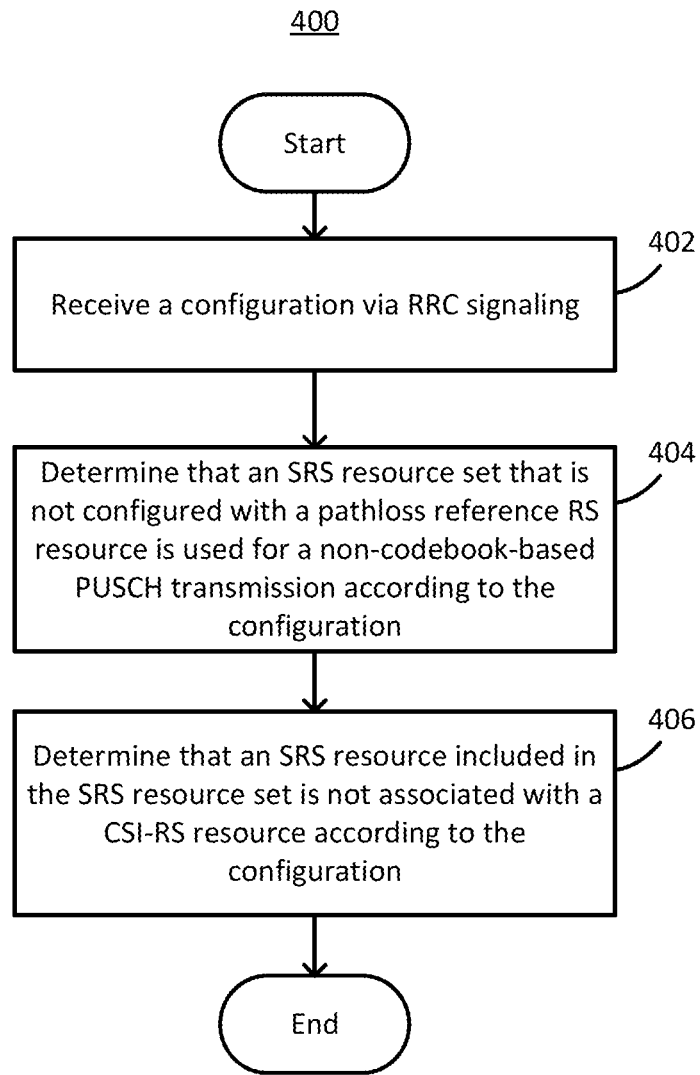
FIG. 4 illustrates a flowchart for a method of UL transmission management, in accordance with an implementation of the present disclosure.

FIG. 4 illustrates a flowchart for a method 400 of UL transmission management, in accordance with an implementation of the present disclosure. The method 400 may be performed by a UE independently or in combination with various implementation(s) described in the present disclosure. In addition, it should be noted that although actions 402, 404, and 406 are delineated as separate actions represented as independent blocks in FIG. 4, these separately delineated actions should not be construed as necessarily order dependent. The order in which the actions are performed in FIG. 4 is not intended to be construed as a limitation, and any number of the described blocks may be combined in any order to implement the method or an alternate method. For example, the order of action 404 and action 406 may be exchanged.

In action 402, a UE may receive a configuration (e.g., an RRC configuration) via RRC signaling.

In action 404, the UE may determine that an SRS resource set that is not configured with a pathloss reference RS resource is used for a non-codebook-based PUSCH transmission according to the configuration. For example, the UE may determine that the usage of the SRS resource set is configured as "nonCodebook" according to the configuration.

In action 406, the UE may determine that an SRS resource included in the SRS resource set is not associated with a CSI-RS resource according to the configuration. For example, the UE may determine that the SRS resource is not associated with a CSI-RS resource when no associatedCSI-RS IE (for indicating a CSI-RS resource) is configured for the SRS resource set. The SRS resource may be an example of the UL resource mentioned in FIG. 3.

Figure 5:
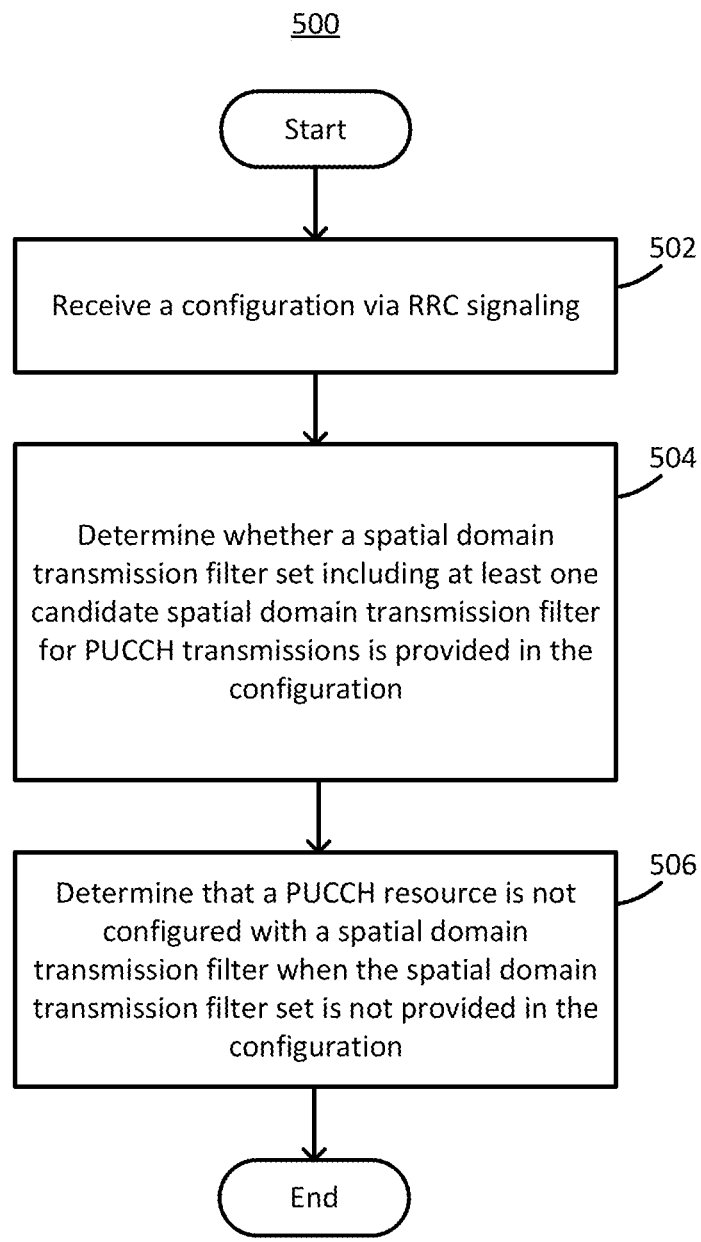
FIG. 5 illustrates a flowchart for a method of UL transmission management, in accordance with an implementation of the present disclosure.

FIG. 5 illustrates a flowchart for a method 500 of UL transmission management, in accordance with an implementation of the present disclosure. The method 500 may be performed by a UE independently or in combination with various implementation(s) described in the present disclosure.

In action 502, a UE may receive a configuration (e.g., an RRC configuration) via RRC signaling.

In action 504, the UE may determine whether a spatial domain transmission filter set including at least one candidate spatial domain transmission filter for PUCCH transmissions is provided in the configuration. As illustrated in FIG. 1, the list 108 of spatial relation information may indicate a spatial domain transmission filter set including N candidate spatial domain transmission filters (e.g., indicated by pucch-spatialRelationInfo #1 to pucch-spatialRelationInfo #N, respectively). The spatial domain transmission filter for a PUCCH resource may be selected from one of N candidate spatial domain transmission filters (e.g., via MAC CE signaling from the BS).

In action 506, the UE may determine that a PUCCH resource is not configured with a spatial domain transmission filter when the spatial domain transmission filter set is not provided in the configuration. For example, if the PUCCH resource is not RRC-configured with a list of spatial relation information (e.g., the list 108 of spatial relation information illustrated in FIG. 1), the UE may determine that the PUCCH resource is not configured with a spatial domain transmission filter. The PUCCH resource may be an example of the UL resource mentioned in FIG. 3.

In one implementation, the UE may transmit, to a BS, a UE capability message indicating that beam correspondence is supported by the UE. If the UE supports beam correspondence, it may mean that the UE has the ability to, for example, select a suitable beam for UL transmission based on DL measurements with or without relying on UL beam sweeping.

The following provides non-limiting descriptions of certain terms.

Beam Failure Recovery: movements in the environment or other events, may lead to a currently established beam pair being rapidly blocked without sufficient time for the regular beam adjust to adapt based on the beam reporting mechanism (the beam reporting mechanism may be similar to the CSI reporting mechanism taken place in the Physical (PHY) channels). A beam failure recovery procedure may be used to deal with such occurrences with a short reaction time.

Beam: the term "beam" here may be replaced by "spatial domain transmission filter." For example, when a UE reports a preferred gNB Tx beam, the UE is essentially selecting a spatial filter used by the gNB. The term "beam information"

may be used to provide information about which beam/ spatial domain transmission filter is being used/selected. In one implementation, individual RSs may be transmitted by applying individual beams (spatial domain transmission filters). Thus, the term "beam" or "beam information" may be represented by RS resource index(es) in some implementations of the present disclosure.

HARQ: A functionality ensures delivery between peer entities at Layer 1 (e.g., the PHY Layer). A single HARQ process may support one Transport Block (TB) when the PHY layer is not configured for DL/UL spatial multiplexing, and when the PHY layer is configured for DL/UL spatial multiplexing, a single HARQ process may support one or multiple TBs. In one implementation, there may be one HARQ entity per serving cell. Each HARQ entity may support a parallel (number) of DL and UL HARQ processes.

Timer: A MAC entity may setup one or more timers for individual purposes, for example, triggering some UL signaling retransmissions or limiting some UL signaling retransmission periods. A timer is running once it is started, until it is stopped or until it expires; otherwise it is not running. A timer can be started if it is not running or restarted if it is running. A timer is always started or restarted from its initial value. The initial value may be but not limited to configured by a BS (e.g., gNB) via DL RRC signaling.

BWP: A subset of the total cell bandwidth of a cell is referred to as a BWP. Bandwidth adaptation may be achieved by configuring a UE with BWP(s) and telling the UE which of the configured BWPs is currently the active one. To enable Bandwidth Adaptation (BA) on the PCell, a gNB may configure the UE with UL and DL BWP(s). To enable BA on SCells in case of Carrier Aggregation (CA), the gNB may configure the UE with DL BWP(s) at least (e.g., there may be none in the UL). For the PCell, the initial BWP may be the BWP used for initial access. For the SCell(s), the initial BWP may be the BWP configured for the UE to first operate at SCell activation. A UE may be configured with a first active UL BWP by a firstActiveUplinkBWP IE. If the first active UL BWP is configured for an SpCell, the firstActiveUplinkBWP IE field may contain the ID of the UL BWP to be activated upon the UE performing the RRC (re-)configuration process. If the field is absent, the RRC (re-)configuration process may not impose a BWP switch. If the first active UL BWP is configured for an SCell, the firstActiveUplinkBWP IE field may contain the ID of the UL BWP to be used upon MAC-activation of an SCell.

QCL: Two antenna ports are quasi co-located if properties of the channel over which a symbol on one antenna port is conveyed can be inferred from the channel over which a symbol on the other antenna port is conveyed. The "properties of the channel" described above may include at least one of Doppler shift, Doppler spread, average delay, delay spread, and spatial Rx parameters. These properties may be categorized into different QCL types in NR TSs. For example, the QCL-type D refers to a spatial Rx parameter. The QCL-type D may be referred to as a "beam."

TCI state: a TCI state may contain parameters for configuring a QCL relationship between one or two DL RSs and a target RS set. For example, a target RS set may be the DM-RS ports of a PDSCH or a PDCCH.

Normal Scheduling Request (SR): A normal SR may be used for requesting an UL Shared Channel (UL-SCH) resource (e.g., a PUSCH resource) for new transmission. The UE may be configured with zero, one, or more than one normal SR configuration. A normal SR configuration may include a set of PUCCH resources for SR across different BWPs and cells. For a logical channel, at most one PUCCH resource for SR may be configured per BWP. Each normal SR configuration may correspond to one or more logical channels. Each logical channel may be mapped to zero or one normal SR configuration. The normal SR configuration of the logical channel that triggered a Buffer Status Report (BSR) procedure (if the configuration of the BSR procedure exists) may be considered as the corresponding normal SR configuration for the triggered SR procedure. When a normal SR procedure is triggered, the normal SR procedure may be considered as pending until it is canceled.

Beam Correspondence: beam correspondence is the ability of a UE to select a suitable beam for UL transmission based on DL measurements with or without relying on UL beam sweeping. Alternatively, beam correspondence may be referred to as the ability of a UE to be indicated a suitable beam for DL reception based on the UL beam sweeping procedure.

Figure 6:
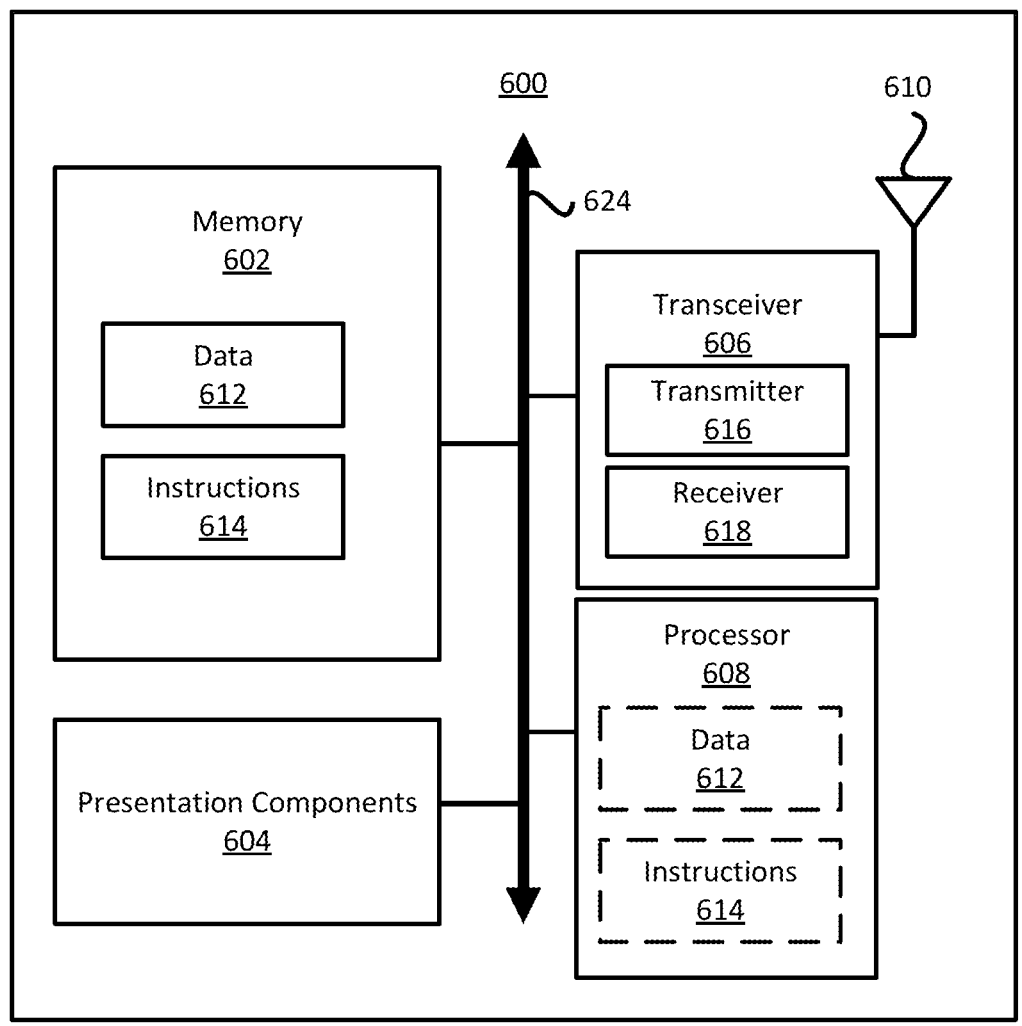
FIG. 6 illustrates a block diagram of a node for wireless communication, in accordance with various aspects of the present disclosure.

FIG. 6 illustrates a block diagram of a node 600 for wireless communication, in accordance with various aspects of the present disclosure. As illustrated in FIG. 6, the node 600 may include a transceiver 606, a processor 608, a memory 602, one or more presentation components 604, and at least one antenna 610. The node 600 may also include a Radio Frequency (RF) spectrum band module, a BS communications module, an NW communications module, and a system communications management module, Input/Output (I/O) ports, I/O components, and power supply (not explicitly illustrated in FIG. 6). Each of these components may be in communication with each other, directly or indirectly, over one or more buses 624. In one implementation, the node 600 may be a UE or a BS that performs various functions described herein, for example, with reference to FIGS. 1 through 5.

The transceiver 606 having a transmitter 616 (e.g., transmitting/transmission circuitry) and a receiver 618 (e.g., receiving/reception circuitry) may be configured to transmit and/or receive time and/or frequency resource partitioning information. In one implementation, the transceiver 606 may be configured to transmit in different types of subframes and slots, including, but not limited to, usable, non-usable and flexibly usable subframes and slot formats. The transceiver 606 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the above should also be included within the scope of computer-readable media.

The memory 602 may include computer-storage media in the form of volatile and/or non-volatile memory. The memory 602 may be removable, non-removable, or a combination thereof. For example, the memory 602 may include solid-state memory, hard drives, optical-disc drives, etc. As illustrated in FIG. 6, the memory 602 may store computer-readable and/or -executable instructions 614 (e.g., software codes) that are configured to, when executed, cause the processor 608 to perform various functions described herein, for example, with reference to FIGS. 1 through 5. Alternatively, the instructions 614 may not be directly executable by the processor 608 but may be configured to cause the node 600 (e.g., when compiled and executed) to perform various functions described herein.

The processor 608 (e.g., having processing circuitry) may include an intelligent hardware device, a Central Processing Unit (CPU), a microcontroller, an ASIC, etc. The processor 608 may include memory. The processor 608 may process the data 612 and the instructions 614 received from the memory 602, and information through the transceiver 606, the baseband communications module, and/or the NW communications module. The processor 608 may also process information to be sent to the transceiver 606 for transmission through the antenna 610, to the NW communications module for transmission to a CN.

One or more presentation components 604 may present data indications to a person or other device. Examples of presentation components 604 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above. Still, many rearrangements, modifications, and substitutions are possible without departing from the scope of the present disclosure.

What is claimed is:

1. A method performed by a User Equipment (UE) for Uplink (UL) transmission management in a wireless communication system, the method comprising:
receiving, from a base station, RRC configuration signaling configuring the UE with a Physical Uplink Control Channel (PUCCH) resource, with PUCCH-Spatial Relation Information (PUCCH-SpatialRelationInfo) of the PUCCH resource not being configured;
determining a default spatial domain transmission filter for the PUCCH resource according to at least one Quasi Co-Location (QCL) parameter selected from of a Control Resource Set (CORESET) having one of a lowest CORESET-ID and a highest CORESET-ID in an active Downlink (DL) Bandwidth Part (BWP); and
transmitting the PUCCH resource by applying the default spatial domain transmission filter.

2. The method of claim 1, wherein the PUCCH resource and the CORESET are associated with a Component Carrier (CC).

3. The method of claim 1, further comprising:
determining a default pathloss reference RS resource for the PUCCH resource by selecting an RS resource with a QCL-type D from a plurality of RS resources indicated by the at least one QCL parameter of the CORESET; wherein the QCL-type D is related to spatial receiving characteristics that may be used by a UE for receiving a target RS or channel.

4. A User Equipment (UE) for Uplink (UL) transmission management in a wireless communication system, the UE comprising:
a transceiver;
a memory; and
at least one processor coupled to the memory, the at least one processor being configured to:
receive, from a base station via the transceiver, RRC configuration signaling configuring the UE with a Physical Uplink Control Channel (PUCCH) resource, with PUCCH-Spatial Relation Information (PUCCH-SpatialRelationInfo) of the PUCCH resource not being configured;
determine a default spatial domain transmission filter for the PUCCH resource according to at least one Quasi Co-Location (QCL) parameter selected from a Control Resource Set (CORESET) having one of a lowest CORESET-ID and a highest CORESET-ID in an active Downlink (DL) Bandwidth Part (BWP); and
transmit, via the transceiver, the PUCCH resource by applying the default spatial domain transmission filter.

5. The UE of claim 4, wherein the PUCCH resource and the CORESET are associated with a Component Carrier (CC).

6. The UE of claim 4, wherein the at least one processor is further configured to:
determine a default pathloss reference RS resource for the PUCCH resource by selecting an RS resource with a QCL-type D from a plurality of RS resources indicated by the at least one QCL parameter of the CORESET, wherein the QCL-type D is related to spatial receiving characteristics that may be used by a UE for receiving a target RS or channel.

* * * * *